United States Patent
Trepka

[15] 3,673,166
[45] June 27, 1972

[54] 1,2-DIALKOXYBENZENES AS RAMDOMIZER FOR COPOLYMERIZATIONS

[72] Inventor: William J. Trepka, Bartlesville, Okla.
[73] Assignee: Phillips Petroleum Company
[22] Filed: Dec. 28, 1970
[21] Appl. No.: 102,109

[52] U.S. Cl. ......................................... 260/83.7, 252/431 R
[51] Int. Cl. ..................... C08d 1/32, C08d 3/02, C08f 19/08
[58] Field of Search ................................................... 260/83.7

[56] References Cited

UNITED STATES PATENTS

| | | | |
|---|---|---|---|
| 2,975,160 | 3/1961 | Zelinski | 260/83.7 |
| 3,335,122 | 8/1967 | Trepku | 260/83.7 |
| 3,418,297 | 12/1968 | Grinninger | 260/83.7 |
| 3,580,895 | 5/1971 | Onishi et al. | 260/83.7 |

*Primary Examiner*—James A. Seidleck
*Attorney*—Young and Quigg

[57] ABSTRACT

A method for copolymerizing monomeric materials using organolithium compounds as initiators in which 1,2-dialkoxybenzene is introduced into the reaction in a quantity sufficient to produce random copolymers.

8 Claims, No Drawings n-butyllithium and 1,2-dimethoxybenzene, this reaction product having been produced as previously described, various mole ratios of n-butyllithium and 1,2-dimethoxybenzene being employed in its formation. Results were as follows:

| Reactants, mole ratio butyllithium to 1,2-dimethoxybenzene | Initiator concentration, meqhm.a | Conversion, percent | Polystyrene, percent | Total styrene, percent | Inherent viscosity |
|---|---|---|---|---|---|
| 1:1 | 1.5 | 89 | 5.8 | --- | 2.46 |
| 1:1 | 2.0 | 81 | 8.8 | --- | 2.14 |
| 1:1.2 | 1.0 | 96 | 5.0 | 22.7 | 3.29 |
| 1:1.2 | 1.25 | 94 | 4.6 | 23.7 | 2.78 |
| 1:1.2 | 2.0 | 98 | 3.3 | 23.3 | 2.31 |
| 2:1 | 1.5 | 97 | 19.0 | 27.2 | 0.94 |
| 2:1 | 2.0 | 97 | 16.9 | 25.5 | 0.79 | a Meqhm.=milliequivalents of lithium per 100 grams of monomer.

These data indicate the effectiveness of the material concerned when added to the polymerization reaction in the form of its reaction product with butyllithium.

Randomized copolymer polymerization mixtures produced according to the method of this invention can be terminated employing coupling agents, such as stannic chloride, in the usual way.

The use of materials such as ethers such as anisole and tetrahydrofuran in producing random copolymers of butadiene with styrene is known. The materials employed in the method of this invention, however, are unexpectedly at least five times more efficient than anisole and tetrahydrofuran in randomizing ability as illustrated by the following example in which 1,2-dimethoxybenzene (DMB) is compared with anisole (A) and tetrahydrofuran (THF).

EXAMPLE III

Seventy-five parts by weight of butadiene and 25 parts by weight of styrene were polymerized in 760 parts by weight of cyclohexane. The randomizer concerned was individually introduced into a reaction mixture to which n-butyllithium in an amount of 0.85 mhm had been added. Polymerization was conducted for one hour at 158° F. after which time the reaction was terminated with a 10 weight percent solution of 2,6-di-tert-butyl-4-methylphenol in a 50/50 volume mixture if isopropyl alcohol and toluene, the amount added being sufficient to provide about 1 part by weight of the antioxidant per 100 parts by weight of monomers charged. Each mixture was then coagulated with isopropyl alcohol and the polymers were recovered and dried. Conversion in each run was 100 percent and each polymer was gel-free. Results were as follows:

| Randomizer Type | phm mhm | Inherent Viscosity | Trans, % | Vinyl, % | Polystyrene, % |
|---|---|---|---|---|---|
| None | | 1.78 | 45.4 | 7.9 | 19.8 |
| DMB | 0.5  3.62 | 1.76 | 32.3 | 38.1 | 0 |
| DMB | 1.0  7.24 | 1.64 | 28.9 | 43.9 | 0 |
| DMB | 1.5 10.86 | 1.79 | 26.7 | 46.8 | 0 |
| A | 0.5  4.63 | 1.78 | 45.3 | 8.3 | 19.2 |
| A | 1.0  9.26 | 1.64 | 45.6 | 8.0 | 19.0 |
| A | 1.5 13.89 | 1.78 | 44.7 | 8.1 | 20.1 |
| THF | 0.5  6.94 | 1.89 | 45.6 | 20.1 | 5.8 |
| THF | 1.0 13.88 | 1.85 | 43.6 | 23.7 | 2.5 |
| THF | 1.5 20.82 | 1.86 | 41.1 | 25.7 | 1.4 |

The above data indicate that the 1,2-dimethoxybenzene is at least five times more effective on a molar basis in randomizing ability than either the anisole or the THF, whereas, based upon the presence of the ether functional groups as effecting such randomizing, the 1,2-dimethoxybenzene might be expected to be only about twice as effective on a molar basis as the anisole and tetrahydrofuran.

The following example demonstrates the relatively greater effectiveness of 1,2-dialkoxybenzene for the purpose concerned in comparison with 1,3-dimethoxybenzene and 1,4-dimethoxybenzene.

EXAMPLE IV

Runs were conducted under the same conditions as those employed in Example I except that 1,3-dimethoxybenzene and 1,4-dimethoxybenzene were individually employed, rather than the 1,2-dialkoxybenzene of this invention.

Results at various concentrations of 1,3-dimethoxybenzene and 1,4-dimethoxybenzene were as follows:

| 1,3-Dimethoxybenzene, phm | Conv., % | Polystyrene, % | Trans., % | Vinyl % | Inherent Viscosity |
|---|---|---|---|---|---|
| 0.029 | 100 | 20.8 | — | — | 0.96 |
| 0.055 | 98 | 20.7 | — | — | 0.95 |
| 0.138 | 95 | 20.6 | — | — | 0.93 |
| 0.276 | 95 | 16.8 | 46.8 | 9.1 | 0.97 |
| 0.552 | 97 | 18.0 | 48.6 | 8.8 | 1.06 |
| 1.10 | 93 | 14.1 | 48.0 | 9.9 | 1.03 |
| 1,4-Dimethoxybenzene, phm | | | | | |
| 0.069 | 100 | 19.6 | — | — | 0.97 |
| 0.138 | 100 | 19.6 | 46.0 | 9.5 | 0.98 |
| 0.345 | 100 | 19.6 | — | — | 0.97 |
| 0.690 | 100 | 19.3 | — | — | 0.95 |
| 1.38 | 100 | 19.2 | — | — | 0.94 |

These data, when compared with those of Example I, demonstrate the high efficiency of 1,2-dimethoxybenzene as a copolymerization randomizing agent and the very low efficiency of the 1,3 and 1,4 isomers of this compound when employed under the same conditions.

It will be evident from the foregoing that various modifications can be made to the method of this invention. Such, however, are considered as being within the scope of the invention.

What is claimed is:

1. A process for preparing copolymers which comprises contacting at least one of a conjugated diene having from four to 12 carbons per molecule and at least one of a vinyl aromatic hydrocarbon having from eight to 20 carbon atoms per molecule with an organolithium compound and a 1,2-dialkoxybenzene having the general formula

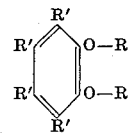

wherein R is an alkyl having in the range of one to about six carbon atoms, R' is H or R, the total of all carbon atoms in all R' groups being less than 11 per molecule and at least one R' is H, said 1,2-dialkoxybenzene being present in a quantity sufficient to promote the formation of random copolymers, and recovering the copolymers.

2. The process as defined in claim 1 in which said 1,2-dialkoxybenzene is introduced into said contact in its unreacted form.

3. The process as defined in claim 1 in which said 1,2-dialkoxybenzene is introduced into said contact as the reaction product of said 1,2-dialkoxybenzene and said organolithium compound.

4. The process as defined in claim 1 in which said 1,2-dialkoxybenzene is introduced into said contact in an amount from about 0.05 to about 1.5 parts by weight per 100 parts by weight of said monomers.

5. The process as defined in claim 3 in which said reaction product is produced by reacting from about 0.75 to about 2 moles of said organolithium compound with about 1 mole of said 1,2-dialkoxybenzene.

6. The process as defined in claim 1 in which butadiene and styrene are polymerized in contact with butyllithium and 1,2-dimethoxybenzene, said 1,2-dimethoxybenzene being present in an amount from about 0.069 to about 1.38 parts by weight per 100 parts by weight of said monomers.

7. The process as defined in claim 2 in which butadiene and

1,2-DIALKOXYBENZENES AS RAMDOMIZER FOR COPOLYMERIZATIONS

This invention relates to copolymerization.

In one of its more specific aspects, this invention relates to the use of 1,2-dialkoxybenzenes as randomizers for butadiene/styrene copolymerizations.

The use of hydrocarbyl alkali metal compounds such as butyllithiums, as initiators in copolymerizations of dienes such as butadiene with styrene is well known. Generally, the hydrocarbyl group is a hydrocarbon radical selected from the group consisting of aliphatic, cycloaliphatic and aromatic radicals which contain in the range of one to about 100 carbon atoms. Lithium is usually present in an amount from about one to about six atoms per molecule of the hydrocarbyllithium; for example, hydrocarbylmonolithium and hydrocarbylpolylithium compounds can be employed.

It has now been determined that 1,2-dialkoxybenzenes can be employed in such processes to effectively promote the randomization of the copolymers so produced. The method of this invention presents such a process.

According to this invention there is provided a process for preparing copolymers which comprises contacting at least two monomeric materials with an organolithium compound and a 1,2-dialkoxybenzene. At least one of the two monomers is selected from the group consisting of conjugated dienes having from four to 12 carbon atoms per molecule. The other monomer is selected from the group consisting of vinyl aromatic hydrocarbons having from eight to 20 carbon atoms per molecule.

The 1,2-dialkoxybenzene is present in the reaction in a quantity sufficient to promote the formation of random copolymers, it being considered that in the absence of the 1,2-dialkoxybenzene and other randomizers, substantially no random copolymers are produced but that block polymers are formed.

In the preferred embodiment of this invention the two monomers are present in a weight ratio of from about 5 to 95 to about 95 to 5.

The 1,2-dialkoxybenzenes which can be employed in the method of this invention are presented by the following formula:

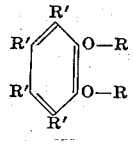

in which

R is an alkyl radical having in the range of one to about six carbon atoms; and, R' is H or R, the total of all carbon atoms in all R' groups being less than 11 per molecule and at least one R' is H.

Among the 1,2-dialkoxybenzenes which can be employed in the method of this invention are 1,2-dimethoxybenzene, 1,2-diethoxybenzene, 1,2-dihexoxybenzene, 3,4-di-n-pentyl-1,2-dimethoxybenzene, and 3,4,5-triethyl-1,2-dimethoxybenzene.

The 1,2-dialkoxybenzene can be introduced into the polymerization reaction in any manner, In one embodiment, it can be reacted with the hyrocarbyllithium and the reaction product is introduced into the polymerization reaction as the initiator. In another embodiment, the 1,2-dialkoxybenzene is introduced into the polymerization reaction mixture into which the hydrocarbyllithium has been introduced as an initiator. In either embodiment, the 1,2-dialkoxybenzenes can be employed individually or as mixtures.

The 1,2-dialkoxybenzenes are employed in accordance with the method of this invention in polymerization reactions which are conducted under any of those reaction conditions conventionally employed in solution polymerization with hydrocarbyllithium initiators which involves the copolymerization of two monomeric materials, i.e., conjugated diolefins, including butadiene and isoprene with vinyl aromatic hydrocarbons such as styrene and related hydrocarbons. If the polymerization mixtures into which a 1,2-dialkoxybenzene has been introduced are to be treated with polymer coupling agents or other reagents which depend upon the presence of terminal polymer-lithium groups, the coupling agent or other reagent should be added as soon as practicable, for example, within 15 minutes, after the desired monomer conversion has been attained.

Regardless of the method of their employment, that is, whether they are reacted with the hydrocarbyllithium and introduced in the form of the reaction product or whether they are introduced, as such, into the reaction mixture, the 1,2-dialkoxybenzenes will be employed in quantities sufficient to provide from about 0.02 to about 5, preferably 0.05 to 1.5, parts per 100 parts of monomers.

If introduced into the reaction mixture as such, the dialkoxybenzene is conveniently introduced in a hydrocarbon, e.g., cyclohexane, solution.

If introduced into the reaction mixture as the product of the reaction with hydrocarbyllithium, the dialkoxybenzene is reacted with the hydrocarbyllithium compound in ratios from about 0.75 to about 2 moles of organomonolithium to about 1 mole of the dialkoxybenzene in an inert hydrocarbon diluent such as cyclohexane at about 122° F. for about 2 hours.

As mentioned, a wide variety of dialkoxybenzenes can be used in the method of this invention. However, the method of this invention will be illustrated employing only a few such materials without meaning to limit the invention to those employed in the examples.

EXAMPLE I

In the following polymerization reactions, 75 parts by weight of butadiene and 25 parts by weight of styrene were polymerized in 760 parts by weight of cyclohexane. The dialkoxybenzene was introduced into the reaction mixture in the amount indicated and butyllithium in the amount of 0.096 parts by weight was added. The reaction was conducted at 158° F. for about 3 hours. An antioxidant, [2,2'-methylene-bis-(4-methyl-6-tert-butylphenol)], was then added in an amount of 1 part per 100 parts by weight of monomer and an isopropyl alcohol coagulant was thereafter employed to recover the polymers.

Under these conditions, results employing various concentrations of 1,2-dimethoxybenzene and 1,2-diethoxybenzene, were as follows:

| 1,2-Dimethoxybenzene, phm[a] | Conv., % | Poly-Styrene, % | Trans., % | Vinyl % | Inherent cosity[b] |
|---|---|---|---|---|---|
| 0 | 100 | 20.5 | 54.1 | 8.7 | 1.21 |
| 0.069 | 100 | 9.1 | 51.7 | 21.7 | 1.07 |
| 0.138 | 100 | 4.2 | 47.9 | 28.9 | 1.05 |
| 0.345 | 100 | 0 | 41.5 | 39.6 | 1.05 |
| 0.690 | 100 | 0 | 37.9 | 48.1 | 1.02 |
| 1.38 | 100 | 0 | 34.1 | 52.4 | 1.01 |
| 1,2-Diethoxybenzene, phm | | | | | |
| 0.033 | 98 | 16.6 | 44.8 | 15.7 | 0.93 |
| 0.166 | 97 | 10.1 | 38.5 | 27.6 | 0.91 |
| 0.332 | 98 | 6.2 | 32.4 | 36.7 | 0.86 |
| 0.664 | 98 | 1.8 | 27.2 | 46.5 | 0.86 |

(a) phm = parts by weight per 100 parts by weight of monomers.
(b) Each polymer was gel-free.

These data indicate the effect of the compounds concerned as randomizing agents.

EXAMPLE II

In the following polymerization reactions, the butadiene/styrene copolymerizations were identical to those of Example I except that no modifier was added and the initiator included the 1,2-dialkoxybenzene as the reaction produce of styrene are polymerized in contact with butyllithium and 1,2-diethoxybenzene, said 1,2-diethoxybenzene being present in an amount from about 0.03 to about 0.66 parts by weight per 100 parts by weight of said monomers.

8. The process as defined in claim 3 in which butadiene and styrene are polymerized in contact with butyllithium and 1,2-dimethoxybenzene, said 1,2-dimethoxybenzene being introduced into said reaction as the reaction product of from about 0.75 to about 2 moles of butyllithium per mole of 1,2-dimethoxybenzene.

* * * * *